ARTICLE SORTING

Filed Dec. 9, 1963

2 Sheets-Sheet 1

| CARD NUMBER AND NUMBER OF CRANK CYCLES | ROD POSITION R4 | R3 | R2 | R1 |
|---|---|---|---|---|
| 0 | — | — | — | — |
| 1 | — | — | — | \| |
| 2 | — | — | \| | — |
| 3 | — | — | \| | \| |
| 4 | — | \| | — | — |
| 5 | — | \| | — | \| |
| 6 | — | \| | \| | — |
| 7 | — | \| | \| | \| |
| 8 | \| | — | — | — |
| 9 | \| | — | — | \| |
| 10 | \| | — | \| | — |
| 11 | \| | — | \| | \| |
| 12 | \| | \| | — | — |
| 13 | \| | \| | — | \| |
| 14 | \| | \| | \| | — |
| 15 | \| | \| | \| | \| |

INVENTOR.
SHELDON B. CHENEY

BY
*Burns, Doane, Benedict, Swecker & Mathis*
ATTORNEYS

Oct. 11, 1966 S. B. CHENEY 3,277,896

ARTICLE SORTING

Filed Dec. 9, 1963 2 Sheets-Sheet 2

INVENTOR.

SHELDON B. CHENEY

BY

Burns, Doane, Benedict, Swecker & Mathis

ATTORNEYS

United States Patent Office 3,277,896
Patented Oct. 11, 1966

3,277,896
ARTICLE SORTING
Sheldon B. Cheney, 1728 Q St. NW., Washington, D.C.
Filed Dec. 9, 1963, Ser. No. 328,964
8 Claims. (Cl. 129—16.1)

This invention relates to article sorters. More particularly this invention relates to a method and apparatus for separating, delivering in a predetermined sequence, and regrouping, a plurality of marginally perforated cards.

Heretofore, various devices have been available for sorting a plurality of marginally perforated cards or the like. Some of these devices have utilized one or more flattened rods adapted to be inserted in marginal notches of dissimilar shapes in a stack of such cards, so as to support the cards when the rods are in one rotational position but to release certain of such cards when the rods are rotated to another position. While such devices are useful in selectively separating individual cards from the stack, they were not convenient for establishing a desired sequence of such cards as in alphabetizing. This was true because it was necessary for an operator to manually rotate each of the flattened rods while adhering exactingly to a complicated operational plan. A departure from the plan caused an error in card sequence.

It is an object of this invention to provide a sorter which may be continuously operated by an unskilled operator without resort to a code or plan of operation.

It is a further object of this invention to provide a method of sorting and a sorter for use therewith wherein each of the flattened rods of the sorter need not be individually manually rotated by an operator.

It is still another object of this invention to provide a sorter for selectively separating individual cards or the like from a group, establishing a predetermined sequence of the cards so separated, and recollecting the cards in a superimposed stack in that sequence.

According to a preferred embodiment of this invention, there is provided a housing, a plurality of card supporting means, and a transmission drivingly interconnecting each of said card supporting means. By driving one of said plurality of card supporting means and thereby driving other of said card supporting means through said transmission, certain of the cards to be sorted may be sequentially separated from the remaining cards and, through the provision of an inventive card deflecting means, regrouped in a superimposed stack in the desired sequence.

A preferred embodiment of the invention is illustrated in the accompanying drawing in which.

Figures 1, 2, 3:
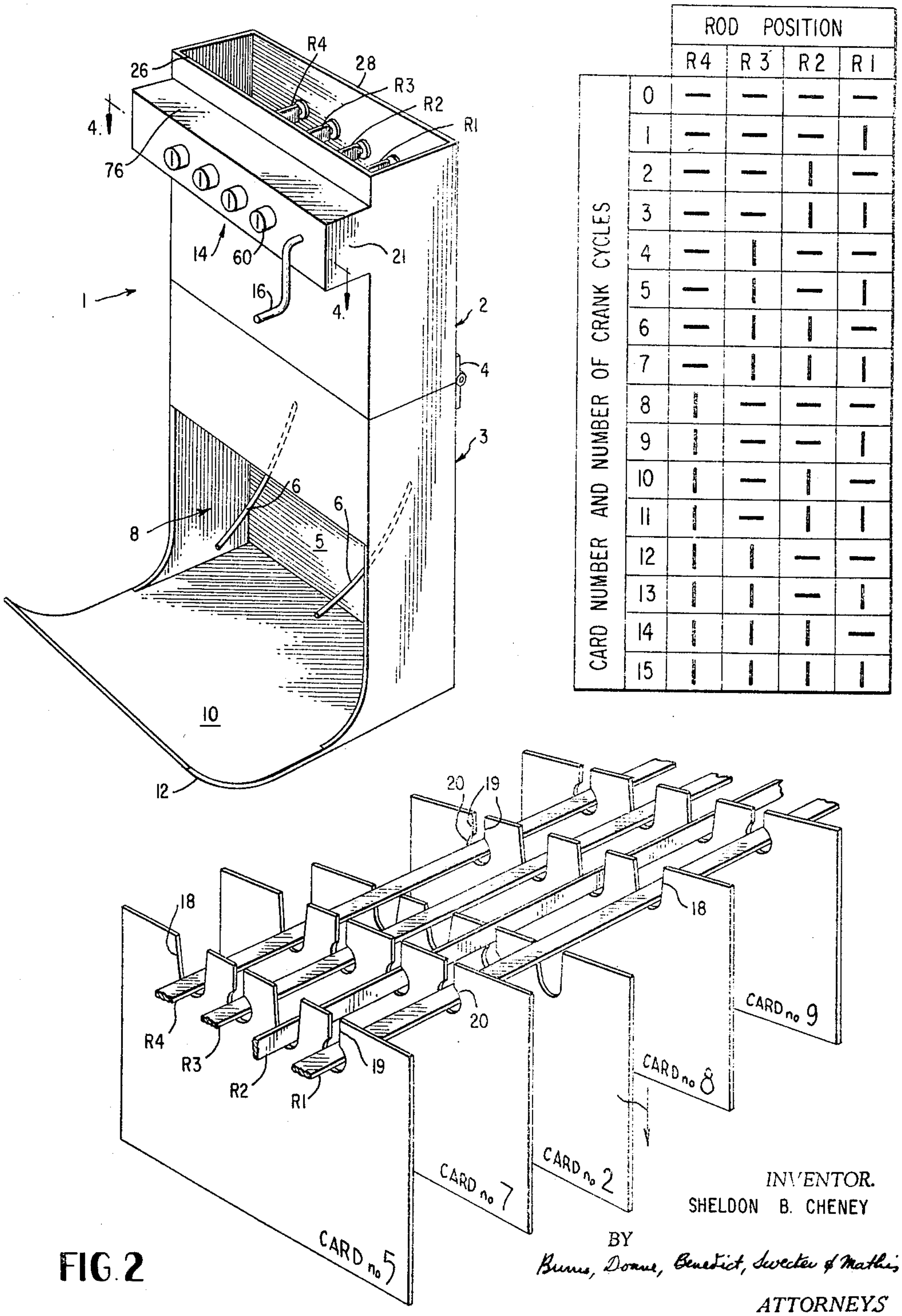
FIGURE 1 is a perspective view of this inventive sorter.
FIGURE 2 is a schematic view of a plurality of marginally perforated cards, the space therebetween being exaggerated, associated with the card supporting means of the sorter shown in FIGURE 1.
FIGURE 3 is a chart indicating the positioning of the card supporting means of the sorter shown in FIGURE 1 after a given number of cycles of operation as well as the arrangement of notches in cards to be sorted.

Referring in more detail to FIGURE 1 of the drawing, the illustrated embodiment of the present sorter includes a vertically extending card receptacle 1 having box-like top 2 and bottom 3 sections, each of these sections being open at both ends thereof. The top 2 and bottom 3 sections are pivotally connected together by a hinge 4 to permit swinging of the top section about the hinge 4 to expose the bottom opening therein for convenient card insertion. Rotatably mounted in the top section 2 adjacent the upper end thereof is a plurality of parallel card supporting, flattened rods R1, R2, R3 and R4, the longitudinal axes of which all being in one horizontal plane. Fixedly extending from a rear wall 5 in the bottom section 3 are two curved card deflecting arms 6 projecting toward a bottom section opening 8. The base of the bottom section 3 is extended in a horizontal direction to provide a flat, card receiving and collecting tray 10 having a vertically extending card retaining lip 12.

Flattened rods R1, R2, R3 and R4 are drivingly connected together by a transmission 14 which is designed so that for each 180 degrees of rotation of a crank 16, a certain card will be released from the group, this release for each card being timed according to a predetermined plan to establish a desired sequence of the cards.

As shown in FIGURE 2, and as known in the art, each of the cards, a sequence of which is to be established, is provided with a plurality of notches along an upper marginal edge thereof. Certain of said cards have notches of a width greater than the cross-sectional, longitudinal dimension of the flattened rods R1, R2, R3 and R4, such a notch being indicated in FIGURE 2 by the numeral 18. One or more of the notches in each card are provided with necked-down portions 19, the clearance therebetween being less than the cross-sectional, longitudinal dimension of the flattened rods, as for example the notch indicated by numeral 20 in FIGURE 2. It is these necked-down notches that perform a card supporting function when the flattened rods therethrough are in horizontal position. However, when each flattened rod through each necked-down notch in a particular card is in a vertical position, the card will be free to fall by virtue of its own weight.

While each of the various cards to be sorted have four notches in the upper margin thereof corresponding to the spacing of rods R1, R2, R3 and R4, the arrangement of wide and necked-down notches across the margin of each card is unique for each card and according to the sequence in which the card is to be released from the stack. For example, card No. 2 is provided with a necked-down notch corresponding to the positioning of rod R2, the remaining notches in card No. 2 being of the wide type and spaced so as to correspond with the positioning rods R1, R3 and R4. It will be seen that regardless of the positioning of rods R1, R3 and R4, when the transmission 14 causes rod R2 to assume a vertical position, card No. 2 will be released and will fall.

Referring to FIGURE 3, cards Nos. 1–15 are provided with necked-down notches at the positions indicated by the vertical lines in the chart and wide notches at the points indicated with horizontal lines. Each of these cards will be released only when the flattened rods coinciding with all of the necked-down notches in that particular card are in a vertical position. FIGURE 3 also indicates the positioning of the various flattened rods R1, R2, R3 and R4 after a given number of transmission cycles, each cycle comprising 180 degrees of rotation of crank 16. For example, after five cycles of rotation of the crank 16 the rods R1 and R3 will be in a vertical position while R2 and R4 will be in a horizontal position thereby releasing card No. 5. Starting from the position wherein all of the rods are horizontal, for each successive cycle 180 degrees of rotation of crank 16 a single card of the group of stack consisting of cards Nos. 1–15 will be released in progressive numerical order.

The operation of this sorter to establish the desired sequence of a plurality of marginally perforated cards is as follows. Each of the flattened rods R1, R2, R3 and R4 is initially positioned so that the cross-sectional, longitudinal axis is vertical. The cards to be sorted are collected in a random order to form a pack with all of the notches along the upper marginal edge of the pack. The top section 2 of the receptacle 1 is pivoted about the hinge 4 thereby exposing the opening in the bottom of the top section 2. The pack of cards to be sorted is then inserted in this opening and the notches thereof positioned about the flattened rods, after which all of the flattened rods are rotated to a position wherein the cross-sectional, longitudinal axes of these rods are horizontal. By rotating the rods to a horizontal position, the pack of cards is retained in the upper end of the sorter by virtue of the fact that the rods through the necked-down notch or notches supports each card by supporting the necked-down portion. The top section 2 is then pivoted downwardly about the hinge 4 to an erect position so that it is aligned with the bottom section 3. Upon rotation of the crank 16 the rods R1, R2, R3 and R4 will be rotated in the order indicated in FIGURE 3 and a single card will fall by gravity, for each crank cycle, to the bottom of the receptacle 1 being deflected through the bottom section opening 8 by the card deflecting arms 6 so as to form a stack of super-imposed cards in the card receiving tray 10.

Figure 4:
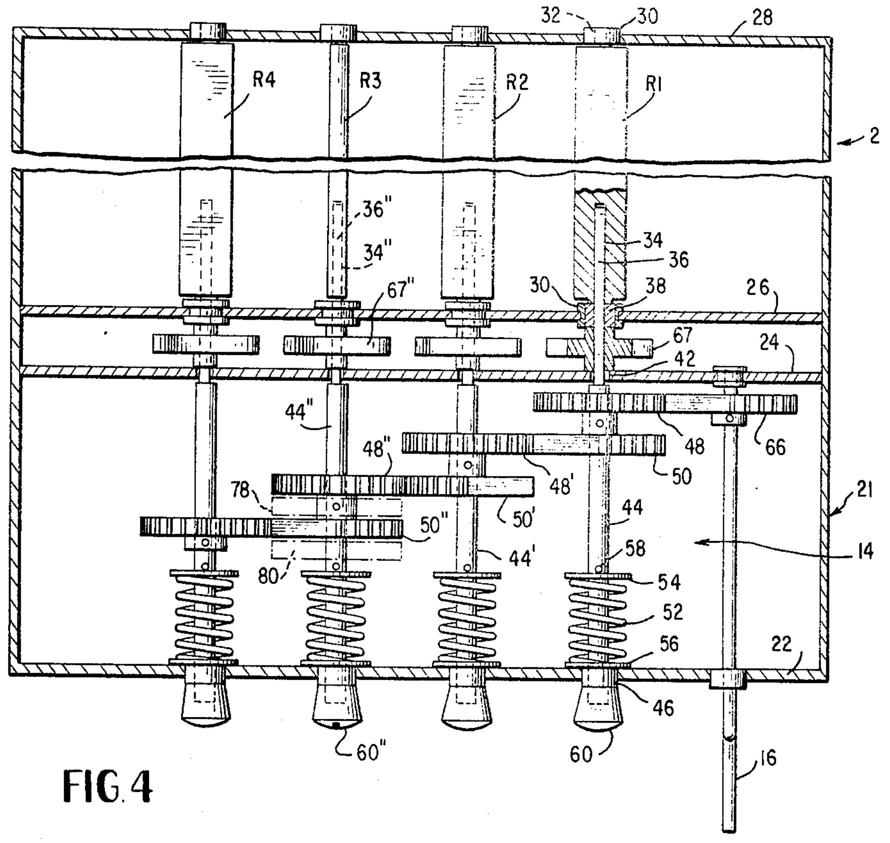
FIGURE 4 is a sectional view of the sorter taken along line 4—4 in FIGURE 1.
Figure 5:
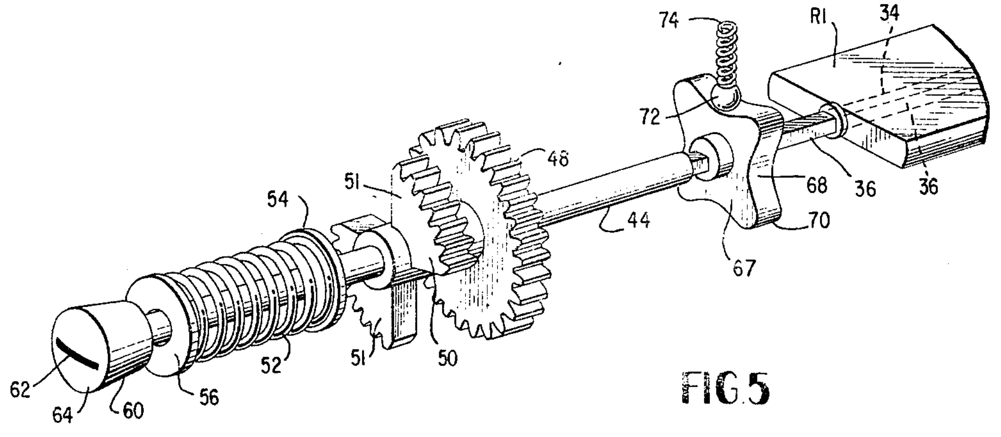
FIGURE 5 is an enlarged perspective view of certain of the elements of the transmission and supporting means shown in FIGURE 4.

The details of the transmission 14, as shown in FIGURES 4 and 5, will now be described. A transmission housing 21 is provided which comprises a front wall 22 and a rear wall 24 which is attached to a front wall 26 of the top section 2 of the housing 1. Since the corresponding drive elements for each of the rods R1, R2, R3 and R4 are the same, only one set will be described. The flattened rod R1, is supported by bearings 30 in a rear wall 28 and the front wall 26 of the top section 2. The rear end of the rod R1 is provided with a tubular extension 32 for rotatably mounting the rod in the bearing 30 positioned in the rear wall 28. Rod R1 is further provided with a square, elongated bore 34 slidably receiving a square shaft 36. The shaft 36 is fixedly received in a circular collar 38 which is rotatably mounted in the bearing 30 in the front wall 26. Shaft 36 extends through openings 42 in the rear wall 24 of the transmission housing 21 and is fixed to a shaft 44, this shaft being supported on its front end in the wall 22 of the transmission housing 14 by a bearing 46.

Fixedly mounted on the shaft 44 is a full gear 48 and double sector gear 50. A compression spring 52 is positioned between washers 54 and 56 on the shaft 44 and retained thereon by pin means 58 and by abutment of the front washer 56 against the wall 22. Fixed on the front end of the shaft 44 is a knob 60 having indicia 62 on its face 64, the long axis of this indicia coinciding with the cross-sectional, longitudinal axis of the rod R1 to thereby indicate the positioning of the cross-sectional, longitudinal axis of this rod.

The sector gear 50 comprises two diametrically opposed segments 51, each of which is adapted to impart 90 degrees of rotation to a cooperating next adjacent full gear 48′ on the shaft 44′. It will be seen that the double sector gear 50 intermittently drivingly engages the next adjacent full gear 48′ only upon every other 90° of rotation of the sector gear 50 thereby providing a 2:1 drive ratio therebetween. Each of the rods R1, R2, R3 and R4 is driven by a full gear thereon which cooperates with an intermittently engaging double sector gear on the next adjacent rod to the right as shown in FIGURE 4.

In the starting position all of the rods R1, R2, R3 and R4 are positioned so that each cross-section, longitudinal axis is horizontal in which position each of the rods may be rotated 90° before its sector gear 50 drivingly engages the next adjacent full gear 48 to the left. Upon rotation of the crank 16 a sector gear 66 thereon causes rotation of the full gear 48 to turn rod R1 to a vertical position and thereby release card 1, this first 90° of rotation of rod R1 causing no movement of rods R2, R3 and R4. Upon another 90° rotation of rod R1, its full gear 48 and its sector gear 50, the sector gear 50 causes the full gear 48′ associated with rod R2 to rotate through an arc of 90° thereby moving rod R2 to a vertical position while rod R1 is turned to a horizontal position. In this position card No. 2 is released. Further rotation of the crank 16 causes the flattened rods to assume the positions indicated in FIGURE 3 and release the cards which have necked-down notches coinciding with all the rods which are in the vertical position at that particular cycle of operation.

It should be noted that, while the preferred transmission 14 is designed to provide a drive ratio of 2:1 between rods R1 and R2, R2 and R3, R3 and R4, any drive ratio may be consistently applied throughout, and any appropriate combination or arrangement of gears may be utilized in establishing this ratio.

Each of the rods R1, R2, R3 and R4 is provided with means to center the rod in either a horizontal or vertical position at the completion of each intermittent drive cycle thereof. Since the elements are the same for each rod, only those for rod R1 will be described. As shown in FIGURE 4, the shaft 36 is provided with a centering cam 67 having four low points 68 and four high points 70. The centering cam 67 cooperates with a ball 72 urged into contact with the cam 67 by a spring 74 the upper end of which is fixedly connected to the top wall 76 of the transmission housing 21. Upon rotation of the shaft 36, the ball 72 travels from low point 68 over high point 70 to the next low point 68 about the periphery of the cam 67. However, due to the urging of the spring 74 the tendency of the shaft 36 to rotate by inertia after disengagement of its full gear 48 with its cooperating sector gear 66 is overcome, the rod R1 is maintained in either a horizontal or a vertical condition and a snap action in rotation of the rod is induced to jarringly release the appropriate card.

To initially set the rods in a horizontal position or to permit a sequence establishing process to begin at a point other than the usual beginning of the sequence, this invention includes transmission disengagement means whereby one of the flattened rods may be turned independently of the other flattened rods. For example, rereferring to FIGURE 3, if it is desired to begin the sequence with card number 4 it is merely necessary to independently rotate rods R1, R2, and R4 to a horizontal position but to rotate rod R3 to a vertical position. Thereafter, rotation of the crank 16 causes card 5 to drop, followed by the remaining cards of the pack to be sequentialized (cards 6–15). To achieve this function, assuming all of the rods R1–R4 to be initially in a horizontal position, it is merely necessary to grasp knob 60″ associated with rod R3 and pull the shaft 44″ and 36″ in an axial direction away from the transmission housing 21. Since the shaft 36″ is slidably received in the recess 34″ of the rod R3 and the centering cam 67″, but the gears 48″ and 50″ are fixedly mounted on the shaft 44″, these gears are carried into a position wherein they are disengaged from adjacent gears. Such a position is indicated by dotted lines in FIGURE 4 denoted by numbers 78 and 80. Upon so positioning the gears 48″ and 50″ in their disengaged location 78 and 80 the shaft 44″ and consequently the rod R3 may be turned to a vertical condition without effecting rotation of the adjacent shafts. By referral to a chart similar to that shown in FIGURE 3, a starting point of the sequence may be selected at any point throughout the sequence. However, after initial positioning of the rods to start a sequence, it is not necessary for an operator to again refer to the chart to produce that sequence.

It will be appreciated that while four flattened rods R1, R2, R3 and R4 are shown, this invention includes within its scope the provision of any number of additional rods. If it is desired to establish a sequence of a greater number of cards than 15, it is merely necessary to provide additional flattened rods in the sorter design.

Further while the crank 16 is shown as provided with a double sector gear 66 so as to achieve an intermittent drive of the transmission during constant rotation of the crank 16 by the operator, it is also within the scope of this invention to provide a full gear instead of a sector gear to provide a continuous drive of the transmission 14. Still further, it is anticipated that it may be desirable to provide power means to rotate the crank 16 in any case.

Also, while the housing 1 is preferred to be constructed of two sections 2 and 3 hingedly connected together, it is contemplated that the housing 1 may be formed from one continuous box-like section. In this modification, the cards to be sorted would be loaded in the housing 1 by dropping the cards through the opening 8 in the bottom of the housing and mounting the card on rods R1–R4 as heretofore described.

From the foregoing it will be seen that the instant sorter provides an inexpensive, accurate and convenient implement for separating, sequentializing and regrouping marginally perforated cards in a superimposed stack. The entire operation may be performed by a operator without resort to an exacting plan of operation. Rather, an operator of the instant sorter may be quite inattentive to the task, it being merely necessary to rotate a crank to quickly and accurately establish a desired sequence of the cards being sorted.

It should be noted that while this invention has been described as a device for sorting cards, it is also within the scope of this invention to utilize the heretofore described method and apparatus in sorting or sequentializing envelopes, folders, pictures or any card-like article that is adapted to be perforated and manipulated as indicated herein.

Various other modifications and alterations will suggest themselves readily to persons skilled in the art. It is intended, therefore, that the foregoing be considered as exemplary only, and that the scope of the invention be ascertained from the following claims.

Having thus described my invention, I claim:

1. An article sequence establishing sorter comprising a housing, a plurality of flattened rods rotatably mounted in said housing, each of said rods having a cross-sectional longitudinal axis, said rods being rotatable from a position adapted to support the articles to be sorted to a position releasing the articles, and transmission means drivingly interconnecting each of said plurality of rods for rotating the cross-sectional longitudinal axis of at least one of said rods to a vertical position while the like axes of the other of said rods are in a horizontal position.

2. A sorter for establishing a sequence of marginally notched articles, such articles being notched according to a predetermined code, said sorter comprising a housing, a plurality of flattened rods rotatably mounted in said housing, each of said rods having a cross sectional longitudinal axis, said rods being rotatable from a position adapted to support the articles to be sorted to a position releasing the articles, and transmission means drivingly interconnecting each of said plurality of rods for rotating said rods in accordance to the predetermined code of said notches in the articles wherein the cross-sectional longitudinal axis of at least one of said rods is moved to a vertical position while the like axes of the other of said rods are in a horizontal position.

3. A sorter according to claim 2 wherein said transmission means includes reduction drive means interposed between certain of said plurality of rods and an adjacent rod of said plurality for driving said adjacent rod at a reduced rate, and transmission disengagement means for disengaging said reduction drive means for rotating said certain of said rods independently of said adjacent rod.

4. The method of sorting a plurality of marginally notched cards to establish a desired sequence thereof, each of the cards having a different arrangement of notches from other of the remaining cards according to a predetermined code, said method comprising suspending all of said cards from a plurality of rods adapted to support each of said cards when the rods are in one rotational position but release each of said cards when the rods are in another rotational position, and driving certain of said rods by imparting movement from an adjacent rod for rotating at least one of said rods to a releasing position while the other of said rods remains in a supporting position to thereby sequentialize the cards.

5. A card sequence establishing sorter comprising a housing, a plurality of flattened rods rotatably mounted in said housing, each of said rods having a cross-sectional longitudinal axis, said rods being rotatable from a position adapted to support the cards to be sorted to a position releasing said cards, transmission means drivingly interconnecting each of said plurality of rods for rotating the cross-sectional longitudinal axis of at least one of said rods to a vertical position while the like axes of the other of said rods are in a horizontal position, and rod centering means adapted to urge said flattened rods to a position wherein each of the cross-sectional longitudinal axes of said rods is horizontal or vertical.

6. A sorter for establishing a predetermined sequence of cards having a plurality of notches therein according to predetermined code, said sorter comprising a housing, a plurality of flattened rods rotatably mounted in the upper end of said housing, said rods adapted to be positioned in the notches of the cards, said rods being rotatable from a position adapted to support each of the cards to a position adapted to release each of the cards, transmission means drivingly interconnecting each of said plurality of rods so as to rotate said rods according to the predetermined code wherein the cross-sectional longitudinal axis of at least one of said rods is moved to a vertical position while the like axes of the other of said rods are in a horizontal position.

7. The method of sorting a plurality of dissimilarly marginally notched cards to establish a desired sequence comprising suspending all of said cards from a plurality of rods adapted to support each of said cards when the rods are in one rotational position but release each of said cards when the rods are in another rotational position, and driving certain of said plurality of rods by imparting rotation to other of said plurality of rods for rotating the cross-sectional longitudinal axis of at least one of said rods to a vertical position while the like axes of the other of said rods are in a horizontal position.

8. A sorter for establishing a sequence of marginally perforated cards comprising a vertically extending housing having front and rear walls, a plurality of flattened rods rotatably mounted adjacent the top of said vertically extending housing, said rods being rotatable from a position adapted to suspend the marginally perforated cards to a position adapted to release the marginally perforated cards, transmission means drivingly interconnecting each of said plurality of rods, said front wall having an opening in the lower end thereof, and card deflecting means adjacent said rear wall and projecting toward said front wall adjacent said opening but above the lower end thereof whereby, as said plurality of flattened rods are rotated to a card releasing position a series of times, a series of the marginally perforated cards will be released and will be collected in a superimposed relation.

References Cited by the Examiner

UNITED STATES PATENTS

| | | | |
|---|---|---|---|
| 1,702,994 | 2/1929 | Buckeridge | 129—16.1 |
| 2,820,458 | 1/1958 | Koons | 129—16.1 |
| 2,993,595 | 7/1961 | Dickinson | 209—72 X |
| 3,073,461 | 1/1963 | Kritzer | 214—7 |

FOREIGN PATENTS

| | | |
|---|---|---|
| 1,215,721 | 11/1959 | France. |

M. HENSON WOOD, Jr., *Primary Examiner.*

J. N. ERLICH, *Assistant Examiner.*